Feb. 12, 1952 — W. S. JOHNSTON — 2,585,783
FISH LURE
Filed May 17, 1948

Walter S. Johnston
INVENTOR.
BY
Attorneys

Patented Feb. 12, 1952

2,585,783

UNITED STATES PATENT OFFICE 2,585,783

FISH LURE

Walter S. Johnston, Emmetsburg, Iowa

Application May 17, 1948, Serial No. 27,412

1 Claim. (Cl. 43—42.13)

This invention comprises a novel and useful fish lure and more specifically pertains to a plug having improved means for insuring or increasing the efficiency of its action in hooking wary fish.

The primary object of this invention is to provide a fishing lure having an improved and more effective operation in setting the hook in a fish, in attracting the attention of the fish by the erratic and life-like movements of the lure and in providing effective means for hooking fish which strike from different positions at the lure.

An important feature of the invention resides in the provision of a lure having an elongated body which is provided with a baffle disposed perpendicular to the longitudinal axis of the body at one end thereof, and which baffle is provided with a pair of laterally and downwardly extending spoon shaped surfaces for imparting an erratic and skipping movement to the lure.

A further important feature of the invention resides in the provision of a lure as set forth in the preceding paragraph which is provided with a novel mounting of fish hook at the rear end thereof, together with an improved swivelling or pivotal connection of fish hook at each side of the lure to thereby hook fish striking from the rear or either side of the lure.

Yet another important feature of the invention resides in the provision of a fishing lure as set forth in the foregoing features, wherein there are provided at each side of the plug, a pair of longitudinally extending guides which are spaced from the sides of the plug, together with a fish hook which is pivoted and slidably mounted on each of the guides, and further provided with resilient means on both sides of the fish hook on each guide to yieldingly resist movement of the fish hook in either direction upon the guide, to thereby assist in setting the fish hook in the mouth of the fish that strikes at the lure.

These, together with various ancillary features and objects of the invention which will later become apparent as the following description proceeds, are attained by this device, preferred embodiments of which have been illustrated by way of example only in the accompanying drawings, wherein.

Figure 3:
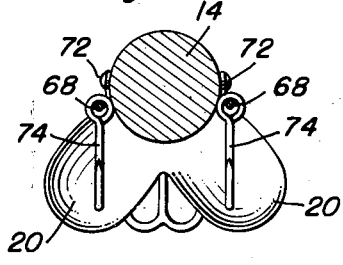
Figure 3 is a vertical transverse sectional detail view taken substantially on the plane of the vertical section line 3—3 of Figure 2 and illustrating in particular the manner of attaching the hooks to the side of the lure; and, Figure 4 is a rear end elevational view of Figure 2.

Referring now more specifically to the accompanying drawings, wherein like numerals designate similar parts throughout the various views, it will be seen that the numeral 10 designates a portion of a fishing line of any suitable type which line is secured to a connector 12 which may be in the form of an eye hook or the like and which connector is mounted in the front end of an elongated plug 14 of any suitable construction, and preferably on the longitudinal axis thereof. Suitable eyes 16 in the form of beads or the like are secured in appropriate position upon the front end of the plug body 14, and in this embodiment the rear end of the plug is provided with a vertically disposed surface which is perpendicular to the longitudinal axis of the plug and to which is secured the central portion 18 of a baffle, having laterally and downwardly depending spoon shaped surfaces 20 which as will be apparent from Figures 3 and 4, extend below and to the sides of the cross sectional area of the plug body 14.

Figure 4:
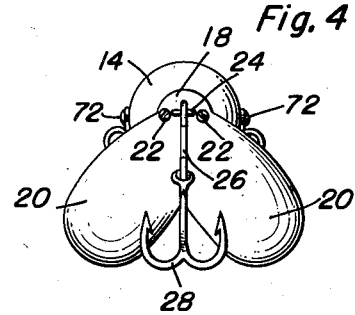

As will be seen best by reference to Figure 4, the baffle is in the form of an inverted heart, and is secured to the end surface of the plug body as by fastening screws 22. Likewise connected to the end surface of the plug is an eye hook 24 which extends through the central portion 18 of the baffle member, and is preferably positioned upon the longitudinal axis of the plug body, this eye hook having a link 26 pivoted thereto, the other end of this link being pivotally connected to a barbed fish hook 28 of any suitable construction.

It is to be understood that the plug body itself may be of any suitable material such as wood or the like, and will preferably be provided with a water resistant varnish or the like, will be appropriately colored and decorated to attract and provoke the attention of fish, and if desired will be treated with a water resistant chemical of any desired nature.

Preferably, the baffle member is made of aluminum, or any other durable and light weight and inexpensive material desired.

The operation of the invention, as so far described will be readily understood. As the plug 14 is retrieved by the line 10, the baffle member secured to the rear end thereof will by its engagement with the surface of the water compel the plug to assume a position whereby the forward end of the plug is elevated and the rear end of the plug is relatively depressed, the plug tending to assume a vertical position. When trolled or retrieved in this position, an erratic, skipping and dancing motion is imparted to the plug which greatly enhances its attractiveness to the fish.

The hook 28 swiveled to the rear end of the plug is particularly positioned and adapted to snare and hook a fish following the lure and striking from the rear thereof.

Figure 1:
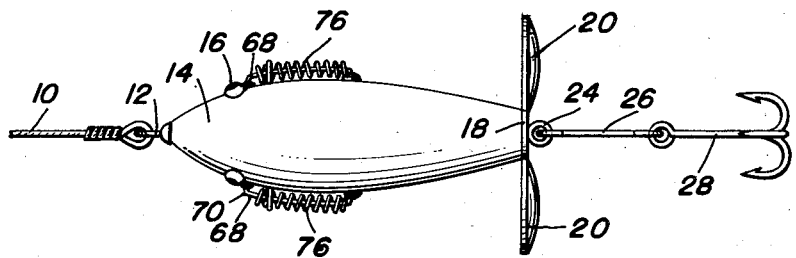
Figure 1 is a top plan view of one embodiment of fishing lure showing the principles of the invention applied thereto.
Figure 2:
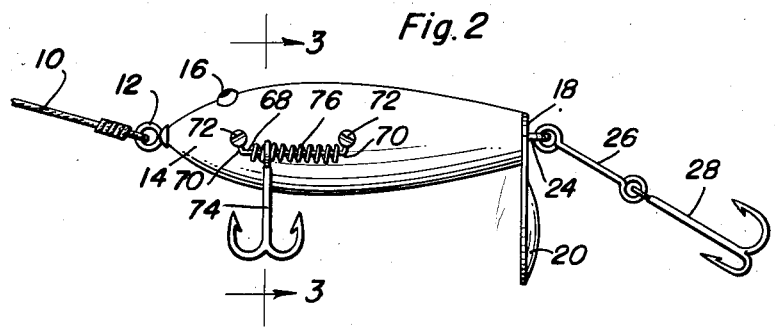
Figure 2 is a side elevational view of the embodiment of Figure 1.

As shown best in Figures 1 and 2, the plug 14 is provided with a pair of guides preferably consisting of longitudinally extending rods or bars 68, which are spaced from the side of the plug body by inturned end portions 70 fastened to and carried by the body as by screws 72. A barbed fish hook 74 is slidably received on each guide rod 68, and is preferably rigidly attached as by solder or welding or the like to a spring member 76 which is slidable upon the guide 68, intermediate the ends of the spring.

With this side hook mounting means it will be seen that when a fish bites from the side, and swallows the hook 74, the action of the spring 76 will be such as to first yield to the resistance of the fish and then impart a jerk to the hook thereby setting the latter in the mouth of the fish to prevent the escape of the fish therefrom. Further, the spring mounting of the hook during the subsequent efforts of the fish to escape from the line will serve to absorb the shock of the efforts of the fish, cushioning the line from the same, and thereby increasing the efficiency of the line and lure in retaining its prey.

From the foregoing, the manner of constructing the improved lure, together with the obvious advantages arising therefrom will be readily understood and further explanation is believed to be unnecessary.

However, since numerous modifications and changes will readily occur to those skilled in the art after a consideration of the foregoing specification and accompanying drawings, it is not intended to limit the invention to the exact construction shown and described, but all suitable modifications and equivalents may be resorted to, falling within the scope of the appended claim.

Having thus disclosed and described the invention, what is claimed as new is as follows:

A fish lure comprising an elongated plug, a fish hook and a fish line connector secured respectively to the rear and front terminals of said plug, a baffle having a central portion mounted on said plug at one end and having downwardly and laterally extending spoon shaped portions, said plug having longitudinally disposed guides spaced from and mounted on the sides thereof, a hook slidably mounted on each guide, spring means mounted on said guide on each side of said hook, said baffle extending perpendicularly to the longitudinal axis of said plug, said central and said laterally and downwardly extending portions being of an inverted heart shape.

WALTER S. JOHNSTON.

REFERENCES CITED

The following references are of record in the file of this patent:

UNITED STATES PATENTS

| Number | Name | Date |
|---|---|---|
| 803,134 | Rhodes | Oct. 31, 1905 |
| 956,872 | Alger | May 3, 1910 |
| 2,159,230 | Sage | May 23, 1939 |
| 2,207,425 | Arbogast | July 10, 1940 |
| 2,230,904 | Parkins | Feb. 4, 1941 |
| 2,459,288 | Robbins et al. | Jan. 18, 1949 |
| 2,527,468 | Turner | Oct. 24, 1950 |